US010358935B2

(12) United States Patent
King et al.

(10) Patent No.: US 10,358,935 B2
(45) Date of Patent: Jul. 23, 2019

(54) GUIDE RING SPACERS FOR TURBOCHARGER

(71) Applicant: BorgWarner Inc., Auburn Hills, MI (US)

(72) Inventors: Matthew King, Mars Hill, NC (US); John R. Zagone, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 218 days.

(21) Appl. No.: 15/331,774

(22) Filed: Oct. 21, 2016

(65) Prior Publication Data
US 2018/0112551 A1    Apr. 26, 2018

(51) Int. Cl.
F01D 9/02    (2006.01)
F01D 9/04    (2006.01)
(Continued)

(52) U.S. Cl.
CPC ........... F01D 17/165 (2013.01); F01D 9/026 (2013.01); F01D 9/041 (2013.01); F01D 17/14 (2013.01); F02B 37/24 (2013.01); F05D 2220/40 (2013.01); F05D 2230/64 (2013.01); Y02T 10/144 (2013.01)

(58) Field of Classification Search
CPC ........ F01D 17/165; F01D 5/043; F01D 9/026; F01D 9/041; F01D 15/08; F01D 17/14; F02B 37/24
See application file for complete search history.

(56) References Cited

U.S. PATENT DOCUMENTS 1,047,663 A * 12/1912 Lawaczeck ........... F04D 29/444
                                                      415/199.3
4,702,672 A * 10/1987 Leicht .................. F01D 17/165
                                                      415/164
(Continued)

FOREIGN PATENT DOCUMENTS

DE      102013106063 A1    3/2014
WO         2008118833 A1   10/2008
(Continued)

OTHER PUBLICATIONS

International Search Report and Written Opinion; dated Jan. 22, 2018; for International Application No. PCT/US2017/057077; 12 pages.

Primary Examiner — David E Sosnowski
Assistant Examiner — Marantha Boardman
(74) Attorney, Agent, or Firm — BrooksGroup

(57) ABSTRACT

A turbocharger comprising: a turbine wheel; a compressor wheel; a shaft member connecting the turbine wheel and the compressor wheel, the shaft member, turbine wheel, and compressor wheel being located along the same longitudinal axis; and a varying geometric technology system comprising a first guide ring member, a second guide ring member, a plurality of rotatable guide vane members positioned between the first and second guide ring members and in a substantially circular arrangement at a first radius from the longitudinal axis, and a plurality of spacer members also positioned between the first and second guide ring members, and located between the longitudinal axis and the circular arrangement of guide vane members.

20 Claims, 4 Drawing Sheets

(51) Int. Cl.
  *F01D 17/14* (2006.01)
  *F01D 17/16* (2006.01)
  *F02B 37/24* (2006.01)

(56) References Cited

U.S. PATENT DOCUMENTS

| | | |
|---|---|---|
| 8,061,976 B2 | 11/2011 | Hall |
| 8,418,460 B2 | 4/2013 | Ehrhard |
| 8,523,511 B2 | 9/2013 | Love et al. |
| 8,668,443 B2 | 3/2014 | Espasa et al. |
| 2015/0125288 A1 | 5/2015 | Heddy, III |
| 2016/0090858 A1 | 3/2016 | Barthelet et al. |

FOREIGN PATENT DOCUMENTS

| | | | |
|---|---|---|---|
| WO | 2011066102 A2 | 6/2011 | |
| WO | WO 2011066102 A2 * | 6/2011 | ........... F01D 17/165 |

* cited by examiner

FIG. 6A   FIG. 6B

GUIDE RING SPACERS FOR TURBOCHARGER

TECHNICAL FIELD

The present invention relates to variable geometry turbine turbochargers, and more particularly to spacers members for such turbochargers.

BACKGROUND OF THE INVENTION

Turbochargers are in wide use today in automobiles and other vehicles to provide increased power and response for the vehicle engines. The turbochargers include a turbine wheel, a compressor wheel and a shaft member connecting together the two wheel members. Exhaust gas from the engine is recirculated into the turbochargers to boost the pressure in the engine and improve performance.

Variable geometry turbine (VGT) turbochargers are designed to allow the effective aspect ratio (A:R) of the turbocharger to be altered as conditions change while the engine is operating. VGTs utilize a ring of rotatable guide vanes to control the flow of exhaust gas into and through the turbine.

VGTs can increase engine power, improve response and have a beneficial effect on emissions. They permit turbine power to be set, providing sufficient energy to drive the compressor at the desired boost level. VGTs are particularly efficient at partial load and minimize or eliminate turbo lag.

The rotatable guide vane members are typically aerodynamically shaped and rotate in unison to vary the gas swirl angle and cross-sectional area. A plurality of spacer members are included adjacent the guide vanes to support the guide ring and mechanical loads. The spacer members, however, often cause disruptions in the gas flow and can reduce efficiency.

It is an object of the present invention to improve the efficiency and performance of VGTs. It is another object to improve the structural integrity of VGTs and reduce the inefficiencies caused by spacer members.

SUMMARY OF THE INVENTION

The present invention is designed to meet these and other objects and provide improved and more efficient variable geometry turbine turbochargers. In particular, the number, shape and location of the spacer members are selected to increase the structural integrity of the VGTs and enhance performance for the desired application of the turbocharger. The spacer members are positioned in the vaneless space between the VGT guide vane members and the turbine wheel. The spacer members preferably have an aerodynamic and/or curved shape and are positioned and angled to provide efficient gas flow to and through the turbine.

Locating the spacer members radially inwardly in the turbocharger provides structural support more directly and in more desirable proximity to the location of applied spring loads in the turbocharger. This results in improved durability and reduced cost for the turbocharger as well as improved efficiency and performance.

Other features, benefits and advantages of the present invention will become apparent from the following written description of the invention, in combination with the attached drawings and appended claims.

BRIEF DESCRIPTION OF THE DRAWINGS

FIGS. 6A, 6B and 6C depict alternate shapes of spacer members in accordance with the present invention.

DESCRIPTION OF PREFERRED EMBODIMENTS

Variable geometry turbine (VGT) turbochargers for vehicle engines increase engine power and improve response. They are designed to allow the effective aspect ratio of the turbocharger to be altered during operation of the engine. VGTs are particularly efficient at low engine speeds and can minimize engine lag. One of the goals of turbochargers is to control the gas flow in order to minimize lag.

A set or ring of rotatable guide vane members are provided to guide and direct the flow of the exhaust gases into and through the turbine wheel. The guide vane members are positioned in a circular formation on a first guide ring member adjacent the turbine wheel and are rotatable around pivot pin members. The guide vane members, which typically have an aerodynamic shape, are rotated in unison by a control actuator mechanism and system. The angles of the vane members vary throughout the engine RPM range to optimize the turbine behavior.

When the guide vane members are closed, they provide narrow passageways for the flow of the exhaust gases to the turbine wheel. The narrow passageways accelerate the exhaust gases toward the turbine blades making them spin faster. The angles of the guide vane members also direct the gas to strike the turbine blades at the desired angle for optimum performance.

When the guide vane members are rotated to their fully open position, the full exhaust gas flow is directed to the turbine wheel.

Spacer members are provided on the first guide ring member to space it from a second guide ring member in the turbocharger. The guide vane members are positioned in the space between the two guide ring members. The spacer members absorb the applied spring load in the turbocharger and provide structural support to the VGT mechanism, as well as allow efficient rotation of the guide vane members.

Figure 1:
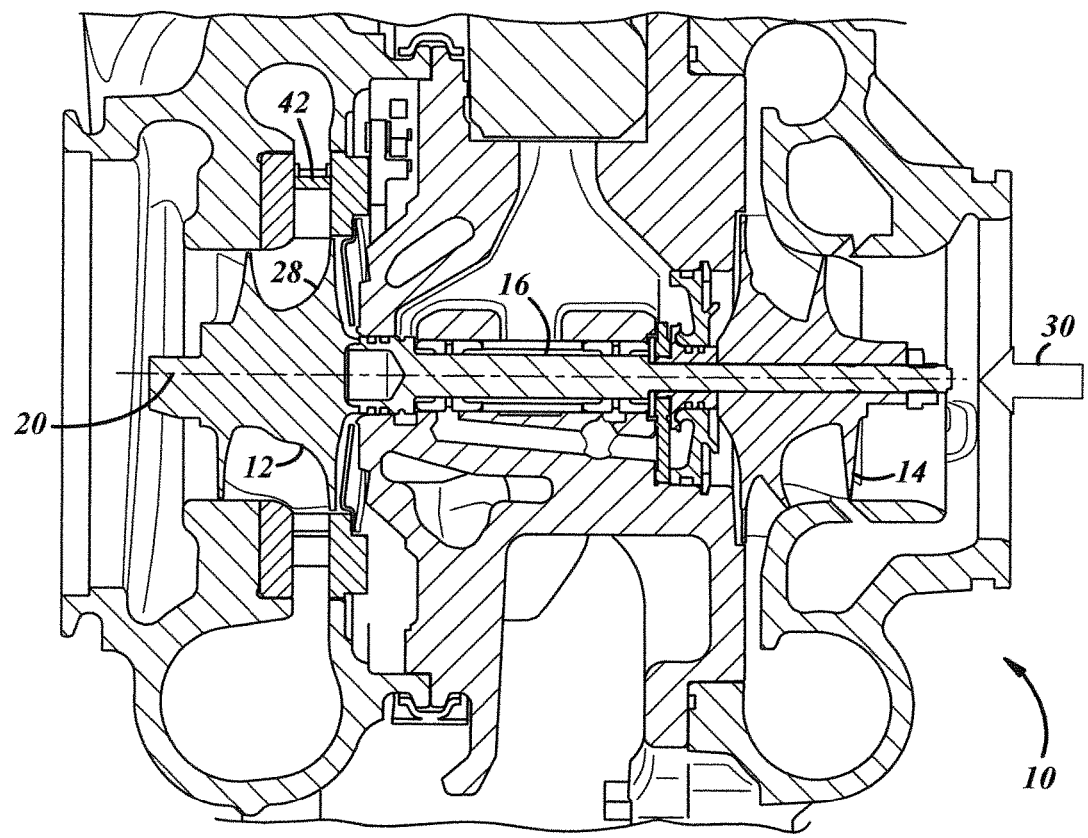
FIG. 1 depicts a cross-section of a representative variable geometry turbocharger with which the present invention can be utilized.
Figure 2:
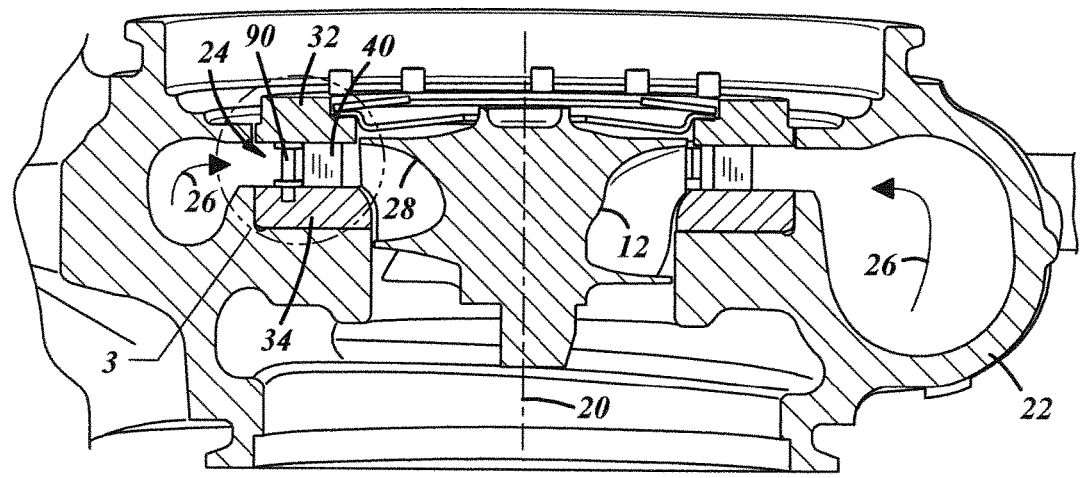
FIG. 2 is a cross section of a representative turbine housing and turbine.
Figure 3:
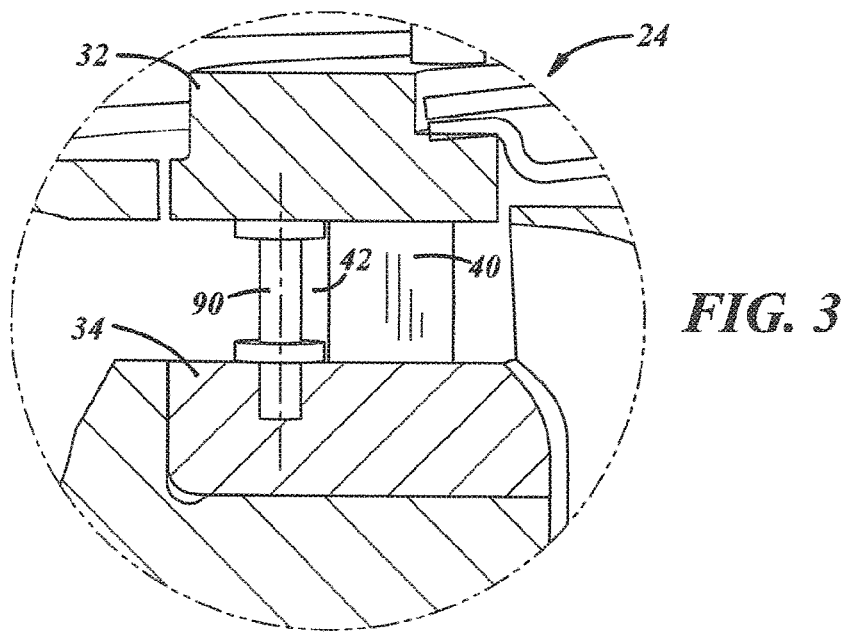
FIG. 3 is an enlarged partial view of a portion of FIG. 2.

A representative turbocharger 10 is depicted in FIG. 1. The turbocharger includes a turbine wheel member 12, a compressor wheel member 14 and a shaft member 16 which connects the turbine wheel and compressor wheel. The turbine wheel, compressor wheel and shaft member are positioned on, and rotate around, a longitudinal axis 20. FIG. 2 is a cross-section of a turbine wheel housing 22, and FIG. 3 is an enlarged view of a portion of FIG. 2 and indicated by the number 3 in FIG. 2. A rotatable guide vane mechanism 24 is positioned adjacent the turbine wheel inlet and guides the gas flow (shown by arrow 26) into the turbine wheel blades 28. As known with turbochargers, the exhaust gas flow rotates the turbine wheel which in turn rotates the shaft member and compressor wheel at the same speed. The compressor wheel then supplies pressurized inlet gas flow 30 back to the engine to boost engine performance.

For a variable geometry turbine turbocharger two guide ring members 32 and 34 are provided along with a plurality of rotatable guide vane members 40. (See FIG. 3.) The first guide ring member 32 is positioned immediately adjacent the turbine wheel, while the second guide ring member 34 is provided in the turbine housing at a spaced distance from the first guide ring member. The two guide ring members support the set of rotatable guide vane members 40 which are positioned on pivot pin members 42. The pin members are held in place by and between the two guide ring members, which allow the guide vanes to pivot or rotate between them.

The rotation of the guide vane members is controlled by an actuator control mechanism or system (not shown). Mechanisms and systems which accomplish this function are well known in the art and do not have to be discussed or depicted in detail. Known actuator systems include, for example, membrane vacuum actuation, electric servo actuation, three-phase electric actuation, hydraulic actuators, and air actuation using air brake system pressure.

The guide ring member 32 is positioned immediately adjacent the turbine wheel 12. The guide ring member 32 has a central opening 44 which directs the exhaust gas into the blades 28 of the turbine wheel.

Figure 4:
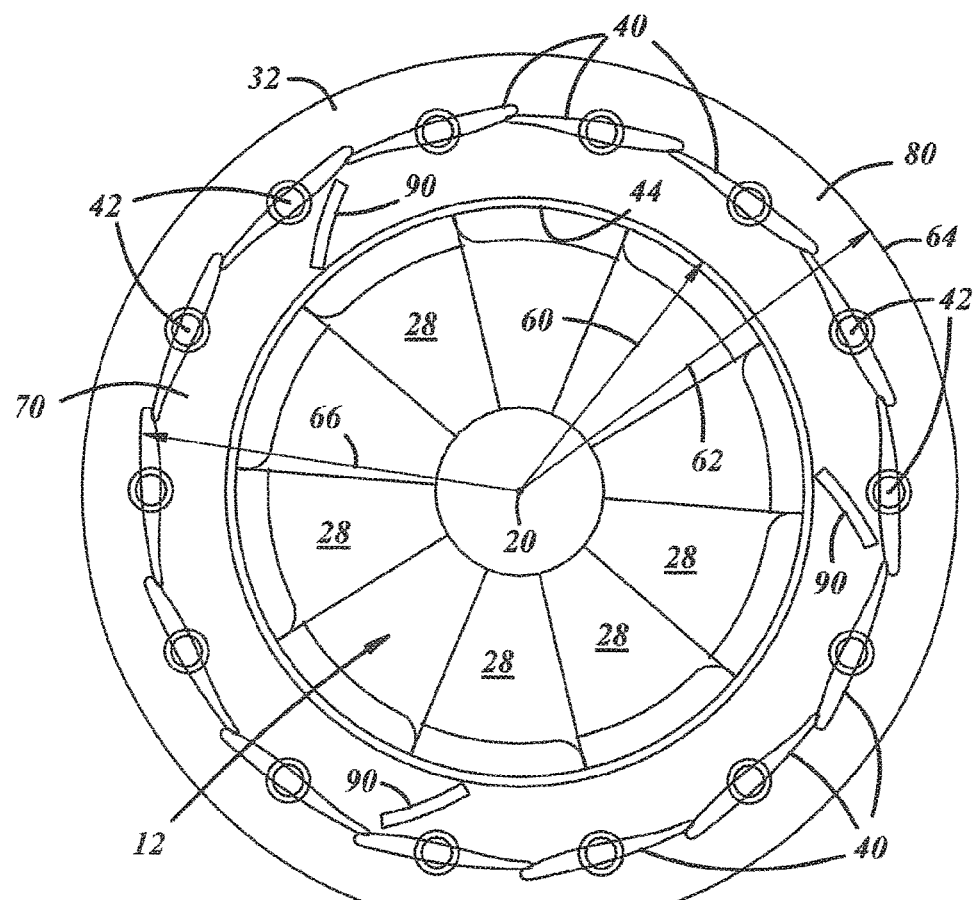
FIG. 4 is a plane view of a guide ring member and turbine wheel of a VGT, with the guide vane members in a closed position.
Figure 5:
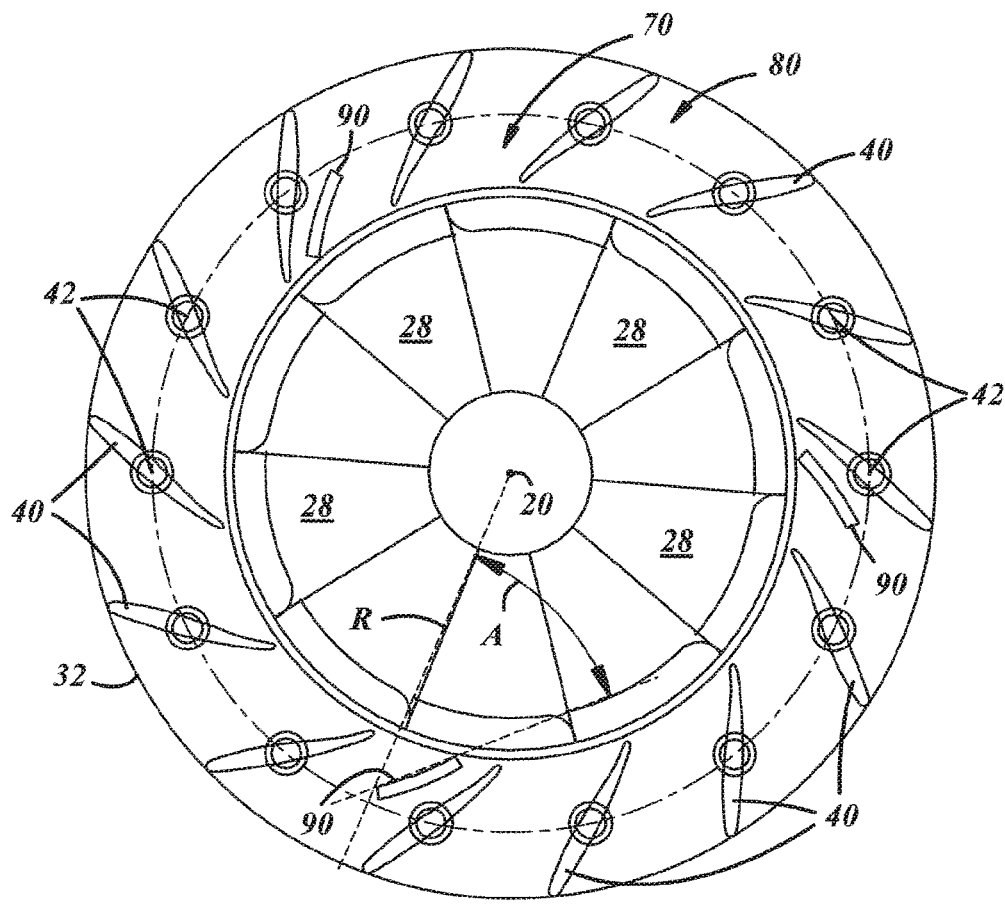
FIG. 5 is a plane view of a guide ring member and turbine wheel of a VGT, with the guide vane members in an open position.

The guide ring member 32 has a first radius 60 from the center of the turbocharger at the longitudinal axis 20, and a second radius 62 from the longitudinal axis 20 to the external outer diameter (OD) 64. Also, as shown in FIGS. 4 and 5, the ring of guide vane members 40 are positioned in a circular configuration on the guide ring member 32 at a third radius 66. The annular area or space 70 on the guide ring member 32 between the first radius 60 and third radius 66 is called the "vaneless space." The annular area or space 80 on the guide ring member 32 radially outside the ring of guide vane members 40 to the outer diameter (OD) 64 of the guide ring member 32 is called the "outer annular space."

In accordance with the invention, a plurality of spacer members 90 are positioned in the annular vaneless space 70 between the first and third radii 60 and 66. This is shown in FIGS. 4 and 5.

The number of spacer members 90 is dependent on the performance characteristics that are desired for the turbocharger. Preferably at least three spacer members 90 are provided, although there can be any number greater than 2. The spacer members also are preferably uniformly positioned spatially around the guide ring member 32, as shown in FIGS. 4 and 5, although the positions can be staggered to reduce or control turbine wheel blade excitation. The locations and spacing of the spacer members on the guide ring member is dependent on a number of factors, such as the desired exhaust gas flow to the turbine or the desired operational performance of the turbocharger.

Figure 6C:
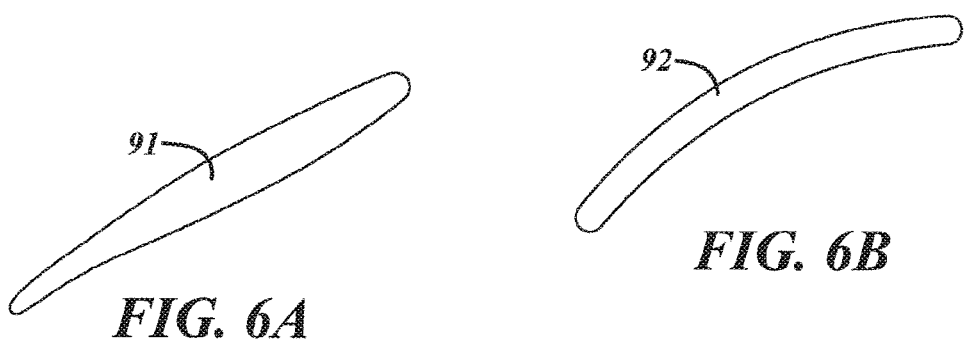
Figure 6C:
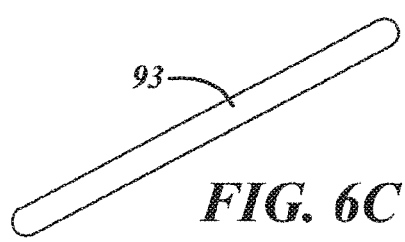

The shape of the spacer members 90 is dependent on many of the same factors as the location and number of the spacer members. Preferably, however, the spacer members have curved shapes, as shown in FIGS. 4 and 5. The spacer members 90 also can have different shapes, such as a curved aerodynamic shape 91 in FIG. 6A, a curved shape 92 in FIG. 6B, or a streamlined constant cross-sectional shape 93 as shown in FIG. 6C.

It is necessary to position the spacer members in positions on the vaneless space 70 such that they do not interfere with the rotation of the guide vane members 40. This, for example, is shown in FIGS. 4 and 5. The spacer member also can be moved in the vaneless space closer to, or directly below, the applied spring load. This can provide additional structural integrity. The spring load is applied to provide vane pack retention.

It is also preferable to position the spacer members at an angle A relative to the radius R of the guide ring member, as shown in FIG. 5, rather than being aligned in a radial manner. The angle A can be within the angle of 15°-75°, and preferably is 30°-60°. The precise angle to be used is dependent upon the operation and use of the turbocharger.

Although the above description has been applied to the guide ring member 32 which is located immediately adjacent to the turbine wheel, substantially the same description applies to the guide vane members and spacer members relative to the second guide ring member 34 which is located on the opposite ends of the guide vane members and spacer members.

The guide vanes are rotatably positioned on pivot pin members 42 which extend between and are connected to each of the first and second guide ring members 32 and 34. The pivot pin members and spacer members are connected to the two guide ring members, while the guide vane members are pivotally or rotationally positioned on the pivot pin members.

Figure 7:
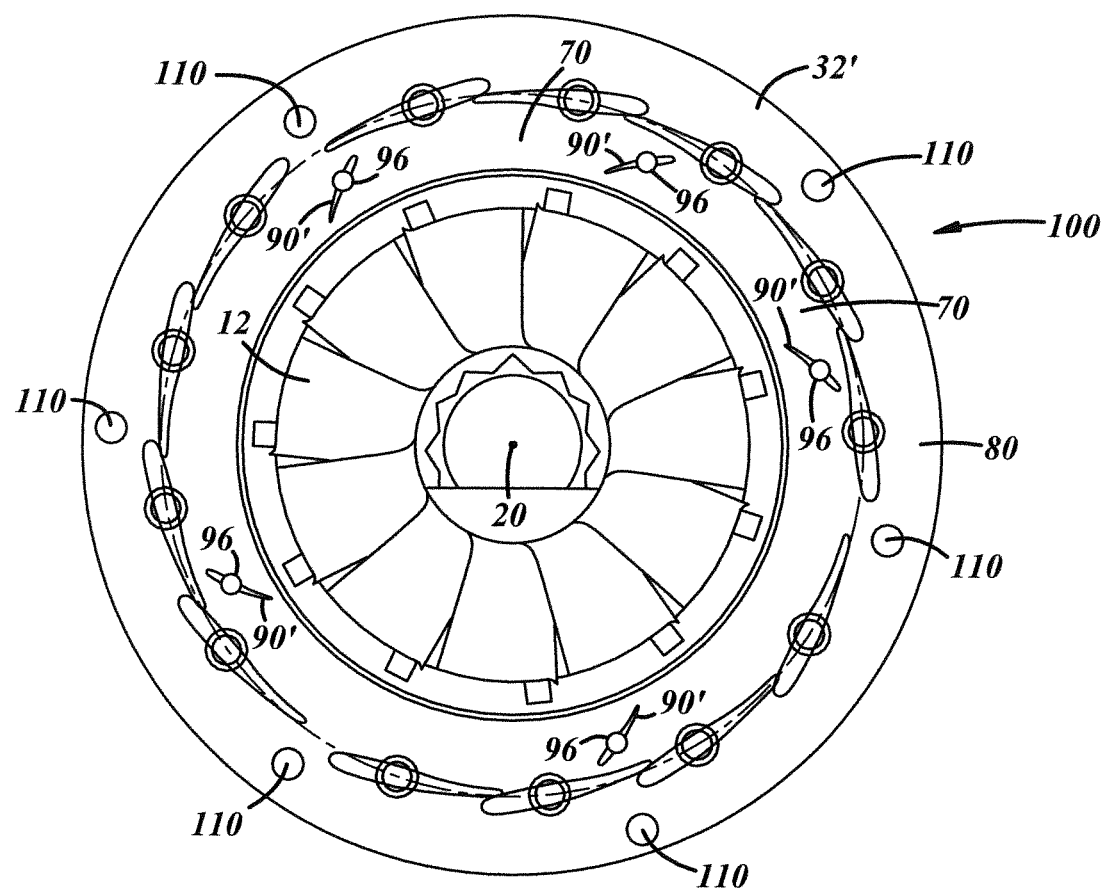
FIG. 7 depicts an alternate embodiment of the invention.

FIG. 7 depicts an alternate embodiment of the invention 100. This embodiment includes both a plurality of spacer members 90' in the vaneless space 70, as well as a second plurality of spacer members 110 positioned radially outside the rotatable guide vane members in the outer space member 80. The spacer members 90' are stationary and held in place by post members 96. This guide ring member is indicated by numeral 32'.

While the invention has been described in connection with one or more embodiments, it is to be understood that the specific mechanisms and techniques which have been described are merely illustrative of the principles of the invention, and numerous modifications may be made to the methods and apparatus described without departing from the spirit and scope of the invention as defined by the appended claims.

What is claimed is:

1. A turbocharger comprising:
a turbine wheel;
a compressor wheel;
a shaft member connecting said turbine wheel and said compressor wheel, said shaft member, turbine wheel, and compressor wheel being located along the same longitudinal axis; and
a varying geometric technology system comprising a first guide ring member, a second guide ring member, a plurality of rotatable guide vane members positioned between said first and second guide ring members and in a substantially circular arrangement at a first radius from said longitudinal axis, and a plurality of spacer members also positioned between said first and second guide ring members constructed and arranged to space the first guide ring member from the second guide ring member, and located between said longitudinal axis and said circular arrangement of guide vane members.

2. The turbocharger as described in claim 1 wherein said spacer members are positioned in a substantially circular arrangement at a second radius from said longitudinal axis, and wherein the length of said second radius is less than the length of said first radius.

3. The turbocharger as described in claim 1 wherein at least two spacer members are provided.

4. The turbocharger as described in claim 1 wherein at least three spacer members are provided.

5. The turbocharger as described in claim 1 wherein each of said plurality of rotatable guide vane members are positioned on a pivot pin member.

6. The turbocharger as described in claim 1 wherein said spacer members each have an aerodynamic shape.

7. The turbocharger as described in claim 1 wherein said spacer members each have a curved shape.

8. The turbocharger as described in claim 1 wherein said spacer members each have a non-linear shape.

9. The turbocharger as described in claim 8 wherein each of the spacer members are positioned at a 15°-75° angle with respect to a radius from said longitudinal axis to one of said guide vane members.

10. The turbocharger as described in claim 1 further comprising a second plurality of spacer members located between said circular arrangement of guide vane members and the external diameter of said first guide ring member.

11. The turbocharger as described in claim 1 wherein the plurality of spacer members are positioned so that the plurality of spacer members do not interfere with the plurality of rotatable guide vanes.

12. A variable geometry turbine (VGT) turbocharger comprising:
- a turbine housing defining a turbine housing interior;
- a turbine wheel disposed within said turbine housing interior;
- a compressor wheel spaced laterally from said turbine wheel along a longitudinal axis;
- a turbocharger shaft extending between and rotatably coupled to said turbine wheel and said compressor wheel along said longitudinal axis; and
- a variable turbine geometry assembly comprising:
- a first guide ring coupled to said turbine housing and disposed within said turbine housing interior, with said first guide ring extending along said longitudinal axis,
- a second guide ring coupled to and spaced from said first guide ring along said longitudinal axis,
- a plurality of pins coupled to one of said first and second guide rings and disposed between said first and second guide rings, with said plurality of pins arranged circumferentially about said longitudinal axis, and with said plurality of pins defining a first radius from said plurality of pins to said longitudinal axis,
- a plurality of guide vanes disposed between said first and second guide rings, with each of said guide vanes coupled to one of said pins for pivoting with respect to said first and second guide rings to regulate a flow of exhaust gas to said turbine wheel, and
- at least two spacers coupled to and disposed between said first guide ring and said second guide ring for spacing said first guide ring from said second guide ring and allowing said plurality of guide vanes to pivot with respect to said first and second guide rings to regulate the flow of exhaust gas to said turbine wheel, with said at least one spacer having a spacer perimeter and an outermost spacer point on said spacer perimeter with respect to said longitudinal axis, and with said outermost spacer point defining a second radius from said outermost spacer point to said longitudinal axis;
- wherein said at least one spacer is disposed entirely between said pins and said longitudinal axis such that said second radius is less than said first radius and said plurality of guide vanes are able to come to a fully-closed position.

13. The variable geometry turbine (VGT) turbocharger as described in claim 12 wherein at least three spacers are provided and said spacers are positioned in a substantially circular arrangement at a second radius from said longitudinal axis, and wherein the length of said second radius is less than the length of said first radius.

14. The variable geometry turbine (VGT) turbocharger as described in claim 13 wherein said at least one spacer is positioned at a 15°-75° angle with respect to a radius from said longitudinal axis to one of said guide vanes.

15. The variable geometry turbine (VGT) turbocharger as described in claim 14 wherein 3-12 spacers are provided.

16. The variable geometry turbine (VGT) turbocharger as described in claim 12 wherein the number of spacers is in the range from 3-12 spacers.

17. The variable geometry turbine (VGT) turbocharger as described in claim 16 wherein said spacers each have an aerodynamic shape.

18. The variable geometry turbine (VGT) turbocharger as described in claim 16 wherein said spacers each have a linear shape.

19. The turbocharger as described in claim 12 further comprising a second plurality of spacers located between said circular arrangement of guide vanes and the external diameter of said first guide ring.

20. A turbocharger comprising:
- a turbine wheel;
- a compressor wheel;
- a shaft member connecting said turbine wheel and said compressor wheel, said shaft member, turbine wheel, and compressor wheel being located along the same longitudinal axis; and
- a varying geometric technology system comprising a first guide ring member, a second guide ring member, a plurality of rotatable guide vane members positioned between said first and second guide ring members and in a substantially circular arrangement at a first radius from said longitudinal axis, and a plurality of spacer members coupled to and positioned between said first and second guide ring members, and located between said longitudinal axis and said circular arrangement of guide vane members, and wherein the plurality of spacer members are positioned so that the plurality of spacer members do not interfere with the plurality of rotatable guide vanes.

* * * * *